US012692181B2

(12) United States Patent (10) Patent No.: US 12,692,181 B2
Rajasekharan et al. (45) Date of Patent: Jul. 28, 2026

(54) SYSTEMS AND METHODS FOR CONTROLLING NITROUS OXIDE PRODUCTION IN WASTEWATER TREATMENT FACILITIES

(71) Applicant: HACH COMPANY, Loveland, CO (US)

(72) Inventors: Vishnu Rajasekharan, Fort Collins, CO (US); Dan Kroll, Fort Collins, CO (US); Matthew Gray, Lafayette Hill, PA (US)

(73) Assignee: HACH COMPANY, Loveland, CO (US)

( * ) Notice: Subject to any disclaimer, the term of this patent is extended or adjusted under 35 U.S.C. 154(b) by 270 days.

(21) Appl. No.: 18/087,375

(22) Filed: Dec. 22, 2022

(65) Prior Publication Data

US 2023/0202889 A1 Jun. 29, 2023

Related U.S. Application Data

(60) Provisional application No. 63/294,532, filed on Dec. 29, 2021.

(51) Int. Cl.
*C02F 3/00* (2023.01)
*C02F 3/30* (2023.01)
(52) U.S. Cl.
CPC ................ *C02F 3/006* (2013.01); *C02F 3/30* (2013.01); *C02F 2209/34* (2013.01)
(58) Field of Classification Search
CPC .. C02F 3/302; C02F 3/006; C02F 3/30; C02F 2209/34

(Continued)

(56) References Cited

U.S. PATENT DOCUMENTS

2013/0171711 A1 7/2013 Finke et al.
2014/0263041 A1* 9/2014 Regmi .................... C02F 3/006
210/608

FOREIGN PATENT DOCUMENTS

CN 212450841 U * 2/2021
CN 113044984 A * 6/2021 .............. C02F 3/305
(Continued)

OTHER PUBLICATIONS

Furukawa et al, JP 1996001184, English machine translation, pp. 1-45 (Year: 1996).*

(Continued)

*Primary Examiner* — Claire A Norris
(74) *Attorney, Agent, or Firm* — Oliff PLC

(57) ABSTRACT

Methods and systems for controlling nitrous oxide production in a wastewater treatment facility in which wastewater is treated with microbes in a biological reactor. Nitrous oxide production can be controlled by determining an amount of two or more nutrients in the biological reactor, calculating a value that represents a comparison of the values, comparing the calculated value to a threshold value, and optionally taking a corrective action to reduce nitrous oxide production based on the comparison. In one aspect, nitrous oxide production can be controlled by determining an amount of ammonium in the biological reactor, determining an amount of a nitrogen compound that can include nitrite, nitrate, and/or hydroxylamine, calculating a value that compares the amount of ammonium to the amount of the nitrogen compound, and taking a corrective action that changes a system parameter to reduce the nitrous oxide production if the calculated value surpasses a threshold limit.

11 Claims, 3 Drawing Sheets

(58) Field of Classification Search
USPC ................................................. 210/630, 614
See application file for complete search history.

(56) References Cited

FOREIGN PATENT DOCUMENTS

| | | | | | |
|----|------------------|-----|---|---------|--------------|
| EP | 1 721 870 | A1 | | 11/2006 | |
| EP | 3255016 | A1 | * | 12/2017 | ...... C02F 3/307 |
| JP | 08001184 | A | * | 1/1996 | |
| KR | 100911688 | B1 | * | 8/2009 | |
| WO | WO-2012052443 | A1 | * | 4/2012 | ...... C02F 3/006 |
| WO | 2015062613 | A1 | | 5/2015 | |
| WO | 2017/207011 | A1 | | 12/2017 | |

OTHER PUBLICATIONS

Zhang et al, CN 113044984 A, English machine translation, pp. 1-9 (Year: 2021).*

Lemaire et al, WO 2012052443 A1, English machine translation, pp. 1-20 (Year: 2012).*

Moon, KR 100911688 B1, English machine translation, pp. 1-18 (Year: 2009).*

Zhang et al, CN 212450841 U, English machine translation, pp. 1-7 (Year: 2021).*

Park , et al., "Emission and Control of Nitrous Oxide from a Biological Wastewater Treatment System with Intermittent Aeration", ournal of Bioscience and Bioengineering, vol. 90, Issue 3, 2000, pp. 247-252; Jan. 24, 2002 1 (Jan. 24, 2002); entire document, especially abstract, Fig. 2, Table 2, p. 247-249, Retrieved on May 5, 2023 from <https://www.sciencedirect.com/science/article/abs/pii/S 1389172300800778.

Law et al; "Nitrous oxide emissions from wastewater treatment processes;" Philosophical Transactions of the Royal Society B; vol. 367; pp. 1265-1277; 2012.

Ni et al; "Modelling nitrous oxide production during biological nitrogen removal via nitrification and denitrification: extensions to the general ASM models;" Environmental Science Technology; 45 (18); pp. 7768-7776; 2011.

Zhu-Barker et al; "The importance of abiotic reactions for nitrous oxide production;" Biogeochemistry; 126; pp. 251-267; 2015.

Massara et al; "A review on nitrous oxide (N2O) emissions during biological nutrient removal from municipal wastewater and sludge reject water;" Science of The Total Environment; 596; pp. 106-123; 2017.

Ahn et al; "N2O Emissions from Activated Sludge Processes, 2008?2009: Results of a National Monitoring Survey in the United States;" Environmental Science & Technology; 44; pp. 4505-4511; 2010.

Hanaki et al; "roduction of Nitrous Oxide Gas during Denitrification of Wastewater;" Water Science and Technology; vol. 26; No. 5-6; pp. 1027-1036; 1992.

Aboobakar et al; "Nitrous oxide emissions and dissolved oxygen profiling in a full-scale nitrifying activated sludge treatment plant;" Water Research; 47; pp. 524-534; 2013.

Czepiel et al; "Nitrous Oxide Emissions from Municipal Wastewater Treatment;" Environmental Science & Technology; 29; pp. 2352-2356; 1995.

Andalib et al; "Correlation between nitrous oxide (N2O) emission and carbon to nitrogen (COD/N) ratio in denitrification process: a mitigation strategy to decrease greenhouse gas emission and cost of operation;" Water Science Technology; 77.2; pp. 426-438; 2018.

Nov. 28, 2025 Extended European Search Report issued in European Patent Application No. 22917239.0.

Park, K. Y., et al. "Emission and Control of Nitrous Oxide from a Biological Wastewater Treatment System with Intermittent Aeration". Journal of Bioscience and Bioengineering. 2020. vol. 90, No. 3, pp. 247-252.

* cited by examiner

POTENTIAL PATHWAYS TO PRODUCE NITROUS OXIDE

FIG. 3

WORKFLOW LOGIC FOR N2O CONTROL STRATEGY

SYSTEMS AND METHODS FOR CONTROLLING NITROUS OXIDE PRODUCTION IN WASTEWATER TREATMENT FACILITIES

CROSS-REFERENCE TO RELATED APPLICATIONS

This application claims the earlier filing date benefit of U.S. Provisional Application No. 63/294,532, which was filed on Dec. 29, 2021. The entirety of this application is incorporated by reference herein.

BACKGROUND

Wastewater treatment plants ("WWTPs") are an important contributor to global greenhouse gas emissions through the production and emission of nitrous oxide ($N_2O$). Nitrous oxide is a potent greenhouse gas having a global warming effect that is 265 stronger than carbon dioxide.

Nitrous oxide production varies significantly in WWTPs, ranging from negligible to substantial, e.g., from about 0% to about 15% relative to incoming nitrogen. There are multiple pathways for nitrous oxide production in WWTPs, and the significant variability in nitrous oxide production is likely due to different plant designs and operational conditions that affect these pathways. In general, plants that achieve high levels of nitrogen removal emit less nitrous oxide.

Although several of the various pathways by which nitrous oxide is produced in a WWTP have been identified, there are currently no reliable control mechanisms in WWTPs to regulate the production of nitrous oxide.

SUMMARY

Accordingly, there is a need to control the production of nitrous oxide in wastewater treatment applications. Controlling the production of nitrous oxide can significantly reduce greenhouse gas emissions and improve overall performance of the WWTP.

In one aspect, this disclosure provides a method of controlling nitrous oxide production in a wastewater treatment facility where wastewater is treated with microbes in a biological reactor. The method includes (i) determining an amount of a first nutrient in the biological reactor; (ii) determining an amount of a second nutrient in the biological reactor, (iii) calculating a value that represents a comparison of the determined amount of the first nutrient and the determined amount of the second nutrient; and (iv) comparing the calculated value to a threshold value.

In another aspect, this disclosure provides a method for controlling nitrous oxide production in a wastewater treatment facility where wastewater is treated with microbes in an anoxic zone and an aerobic zone. The method includes determining an amount of ammonium in the aerobic zone, determining an amount of one or more nitrogen compounds in the aerobic zone, where the one or more nitrogen compounds includes at least one of nitrite and nitrate, calculating a value that represents a comparison of the determined amount of ammonium and the determined amount of the one or more nitrogen compounds, and comparing the calculated value to a threshold value.

In another aspect, this disclosure provides a method for controlling nitrous oxide production in a wastewater treatment facility in which wastewater is treated with microbes in an anoxic zone and an aerobic zone. The method includes determining an amount of at least one of total organic carbon (TOC) and chemical oxygen demand (COD) in the aerobic zone, determining an amount of one or more nitrogen compounds in the aerobic zone, where the one or more nitrogen compounds includes at least one of nitrite, nitrate, and hydroxylamine, calculating a value that represents a comparison of (a) the determined amount of the at least one of the TOC and the COD, and (b) the determined amount of the one or more nitrogen compounds, and comparing the calculated value to a threshold value.

In another aspect, this disclosure provides a control system for controlling nitrous oxide production in a wastewater treatment facility in which wastewater is treated with microbes in a biological reactor. The control system includes a controller that is configured to (i) receive a signal corresponding to a determined amount of a first nutrient in the biological reactor; (ii) receive a signal corresponding to a determined amount of a second nutrient in the biological reactor; (iii) calculate a value that represents a comparison of the determined amount of the first nutrient and the determined amount of the second nutrient; (iv) compare the calculated value to a threshold value; and (vi) based on the comparison of the calculated value to the threshold value, send a signal that is configured to cause at least one of (a) a notification to be displayed on a display; and (b) a system parameter of the wastewater treatment facility to be changed.

BRIEF DESCRIPTION OF THE DRAWINGS

FIG. 3 is a schematic diagram illustrating nitrous oxide production pathways in a wastewater treatment plant.

DETAILED DESCRIPTION OF EMBODIMENTS

As described in detail below, aspects of this invention involve determining multiple parameters of a wastewater treatment system and taking corresponding control actions that facilitate a reduction in nitrous oxide formation. The parameters can be determined by laboratory measurements, online sensors, or calculations using mathematical models. The control methods described herein can be implemented on any WWTP to control the production of nitrous oxide, including systems that are configured to treat municipal wastewater, industrial wastewater, or agricultural wastewater, for example. Specific examples include WWTPs that treat sewer wastewater, paper waste water, brewery wastewater, and poultry plant wastewater.

Figure 1:
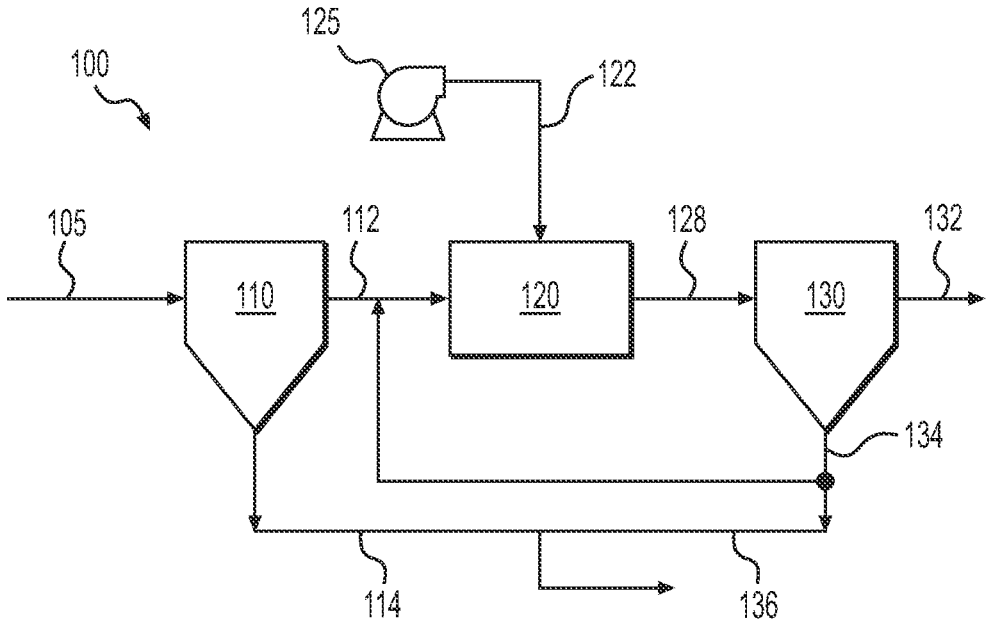
FIG. 1 is a schematic diagram of a wastewater treatment plant according to one embodiment.

One simplified example of a WWTP 100 is shown schematically in FIG. 1. In general, WWTPs use activated sludge to biologically treat wastewater. In a typical process, wastewater is treated by suspending microbes in the wastewater in a bioreactor. The microbes metabolize organic and inorganic components in the wastewater. The microbes usually form aggregates or flocs in the wastewater, which is referred to as activated sludge. The sludge and wastewater mixture is referred to as the mixed liquor. In the WWTP 100, a wastewater influent 105 (which may have already been subjected to various filtration and pretreatment processes) is sent to a primary clarifier 110 which separates the wastewater into a primary effluent 112 and raw sludge 114. The primary effluent 112 is sent to biological reactor 120 in which the microbes are suspended in the wastewater. Air 122 is added to the biological reactor 120 via compressor or blower 125. The mixed liquor 128 is sent to a second clarifier 130 which separates the mixed liquor 128 into treated effluent 132 and activated sludge 134. Most of the activated sludge 134 is recycled back to the biological reactor 120. A portion of the activated sludge can be removed as waste sludge 136 and disposed of after additional treatment.

The biological reactor 120 removes nitrogen from the wastewater before it is discarded as the treated effluent 132. Nitrogen is present in wastewater in the form of organic nitrogen compounds (e.g., amino acids, amino sugars, and proteins), ammonium ($NH_4^+$), nitrite ($NO_2^-$), and nitrate ($NO_3^-$). The organic nitrogen compounds can be converted to ammonium in the bioreactor, and the ammonium can be converted to nitrite and nitrate by autotrophic nitrification, which takes place under aerobic conditions. The nitrite and nitrate are then reduced to $N_2$ by heterotrophic denitrification, which takes palace under anoxic conditions. A sufficient amount of organic carbon is required to promote denitrification.

Figure 2:
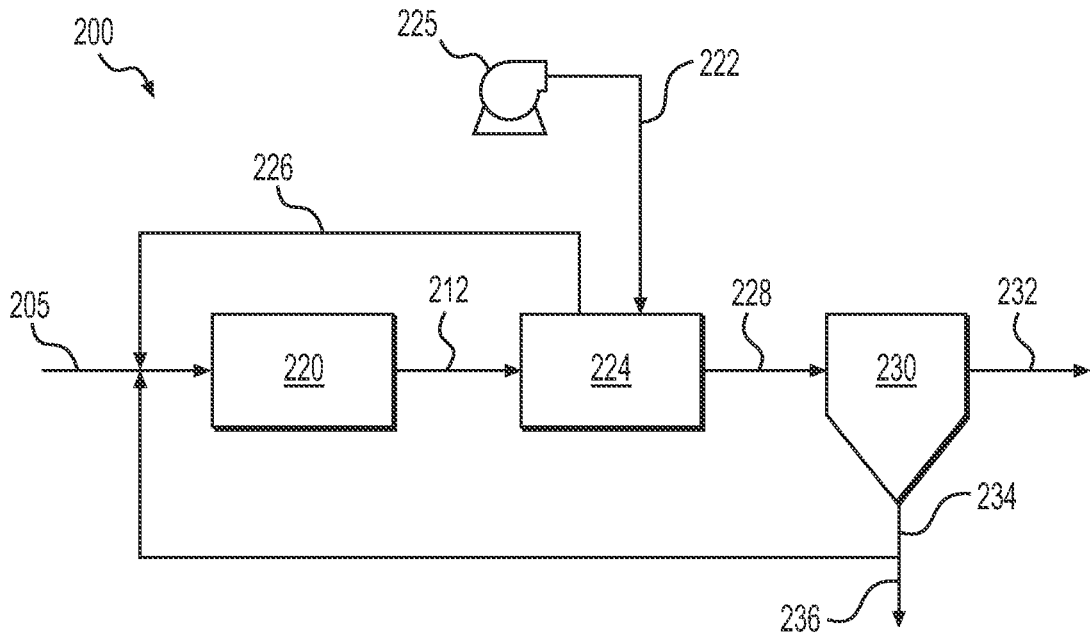
FIG. 2 is a schematic diagram of a wastewater treatment plant according to another embodiment.

FIG. 2 schematically illustrates another example of a WWTP 200. WWTP 200 uses a modified Ludzack-Ettinger configuration which provides a continuous system in which the wastewater flows through separate anoxic and aerobic zones to respectively promote denitrification and nitrification processes. In this WWTP 200, an anoxic reactor 220 is upstream of an aerobic reactor 224. In some embodiments the aerobic reactor 224 can be upstream of the anoxic reactor 220. The anoxic reactor and aerobic reactor in the WWTP correspond to reaction zones in which anoxic conditions or aerobic conditions are respectively present. In FIG. 2, these zones are shown as separate reaction vessels (e.g., tanks or other compartments). However, in other embodiments the anoxic and aerobic zones may be defined by periods during which the anoxic or aerobic conditions are present. In this regard, as used herein, any stream (e.g., 134, 234 in FIGS. 1 and 2 respectively) that returns activated sludge from the aerobic reactor is considered part of the aerobic zone of the biological reactor.

In the FIG. 2 embodiment, the wastewater influent 205 (which may have already been subjected to clarification and other pretreatment processes) is sent to the anoxic reactor 220. The effluent 212 of the anoxic reactor 220 is sent to aerobic reactor 224. The aerobic reactor 224 is supplied with air 222 by compressor/blower 225. At the end of the aerobic reactor 224, mixed liquor 226 is recirculated back to the anoxic reactor 220. The recirculated mixed liquor 226 includes nitrified wastewater, which contains nitrates. The mixed liquor effluent 228 is separated by secondary clarifier 230 into treated effluent 232 and activated sludge 234. Here also, most of the activated sludge 234 is recycled back to the anoxic reactor 220. A portion of the activated sludge can be removed as waste sludge 236 and disposed of after additional treatment. In alternative embodiments, the WWTP can include multiple anoxic reactors and multiple aerobic reactors, e.g., alternately arranged such as anoxic-aerobic-anoxic-aerobic.

Figure 3:
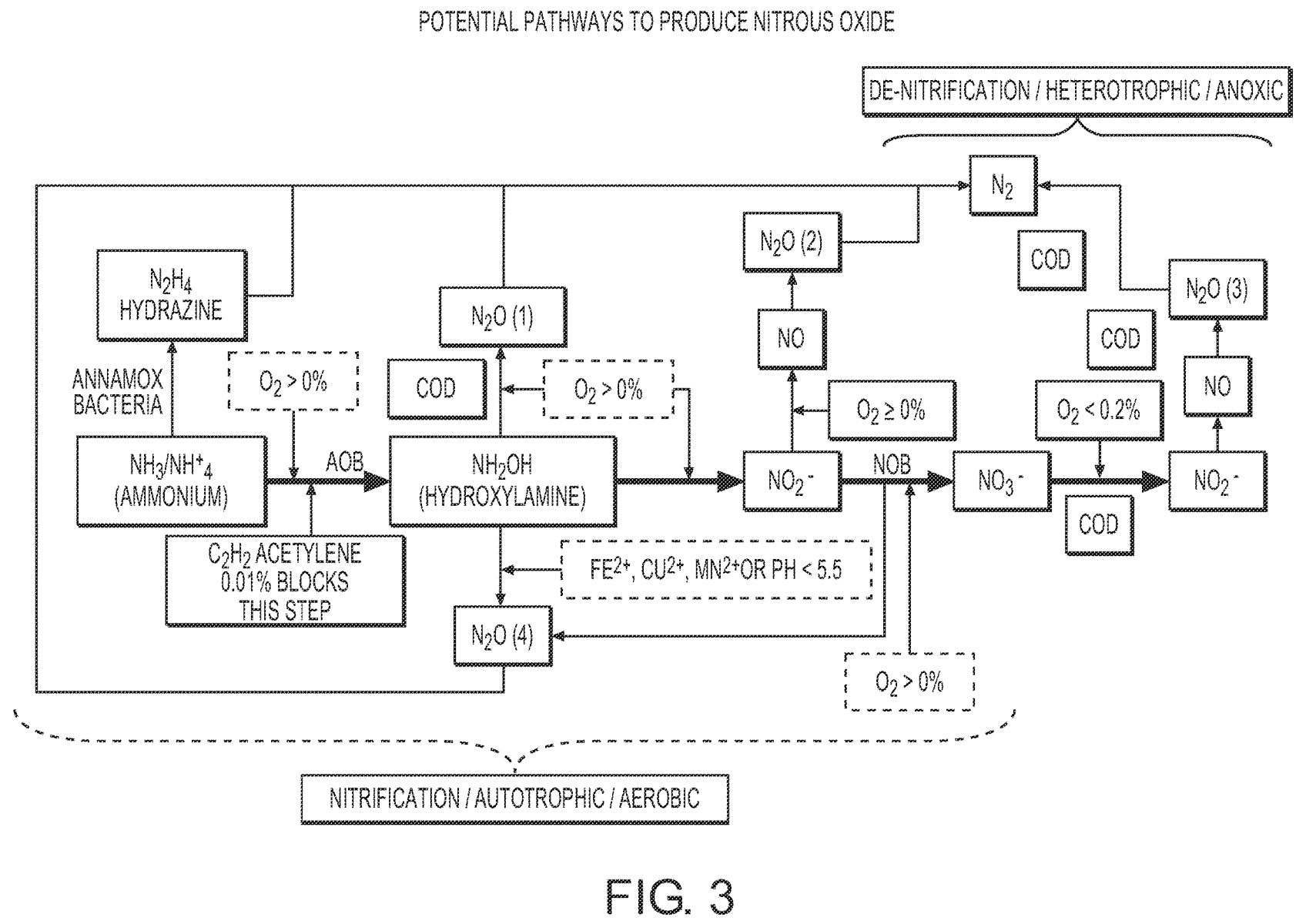

FIG. 3 illustrates some of the significant pathways by which nitrous oxide is produced in a WWTP. Specifically, (1) nitrous oxide can be produced by ammonium-oxidizing bacteria (AOB) in a nitrification-hydroxylamine ($NH_2OH$) pathway; (2) nitrous oxide can be produced in a nitrifier-denitrification process of nitrite ($NO_2^-$) pathway; (3) nitrous oxide can be produced by sequential heterotrophic denitrification carried out by heterotrophic bacteria (HB) in a nitrate ($NO_3^-$) pathway; and (4) nitrous oxide can be produced in reactions between nitrogen cycle intermediates (e.g., hydroxylamine, nitric oxide (NO), and nitrite) and redox active metals (e.g., iron, copper, and manganese) or organics (e.g., humic and fulvic acids) in an abiotic pathway. See, e.g., "Modelling nitrous oxide production during biological nitrogen removal via nitrification and denitrification: extensions to the general ASM models," Bing-Jie Ni et al., Environmental Sci. Technol., 45 (18), pp. 7768-7776 (2011), which is incorporated by reference herein.

As can be seen in FIG. 3, each of these pathways can be impacted by a number of process variables including amounts of dissolved oxygen (DO), total organic carbon (TOC), chemical oxygen demand (COD), nitrite, nitrate, as well as the type of organic carbon, pH, temperature, aeration/air flow rate, and residence times of the aerobic and anoxic zones. See, e.g., "Correlation between nitrous oxide (N2O) emission and carbon to nitrogen (COD/N) ratio in denitrification process: a mitigation strategy to decrease greenhouse gas emission and cost of operation," Andalib et al., Water Sci. Technol., 77 (1-2), pp. 426-438 (2018), which is incorporated by reference herein.

Of the above potential pathways, it is believed that nitrous oxide emissions primarily occur in aerated zones (e.g., aerated tanks, compartments, or periods) caused by active stripping and AOB, rather than the heterotrophic denitrification pathway, for example. However, the detailed mechanisms of each pathway are not fully understood.

Figure 4:
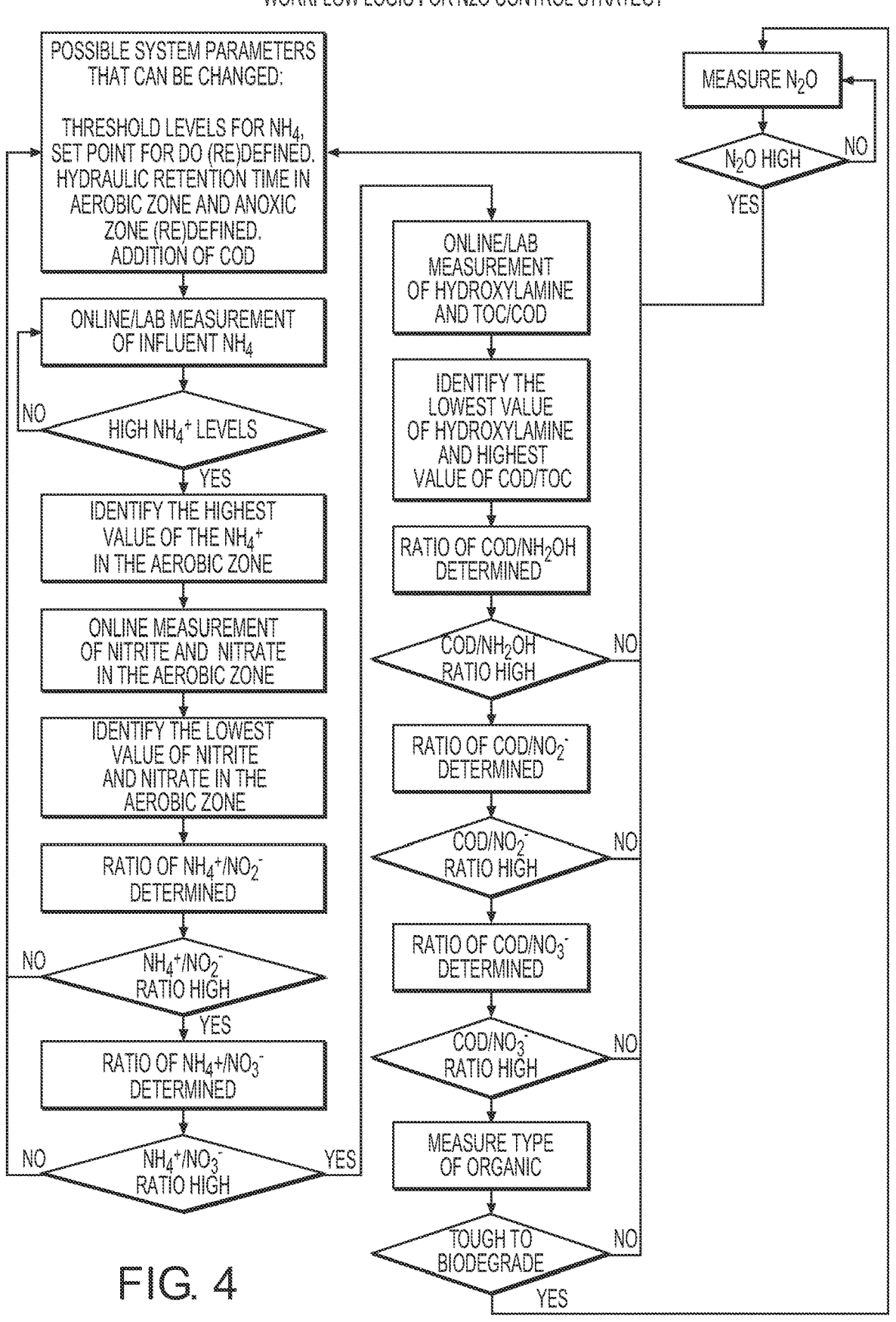
FIG. 4 is a schematic diagram illustrating methods that can be used to control nitrous oxide production in a wastewater treatment facility.

FIG. 4 illustrates methods that can be used to control nitrous oxide production in a WWTP by considering several measured and/or calculated parameters of the system and then comparing those parameters to threshold values. In general, the amounts of two or more nutrients in the biological reactor, or its influent, can be measured or calculated and used to control nitrous oxide production. The nutrients can include, e.g., nitrogen-containing compounds or phosphorous-containing compounds. Some specific nutrients that can be directly measured or calculated in the WWTP according to some embodiments include, e.g., (i) ammonium concentration in an influent (i.e., upstream of the biological reactor(s)); (ii) ammonium concentration in each of the aerobic zone and anoxic zone; (iv) nitrite concentration in each of the anoxic zone and aerobic zone; (v) nitrate concentration in each of the anoxic zone and aerobic zone; and (vi) hydroxylamine concentration in each of the anoxic zone and aerobic zone. In addition to the above components, other parameters of the bioreactor can be measured such as dissolved oxygen (DO) in each of the anoxic zone and aerobic zone; and TOC and/or COD in each of the anoxic zone and the aerobic zone. The measurement of nutrients and organics in various treatment zones can be achieved by lab, online, or calculations either through deterministic or statistical methods. Many of these variables can be directly measured with online probes, including e.g., ammonium concentrations, nitrate concentrations, nitrite concentrations, and TOC. FIG. 4 shows one embodiment by which various of these measured values can be used to control nitrous oxide production.

As a starting point, a threshold value for ammonium in an influent of the system can be defined, and a threshold value of the COD can be defined. The initial set point of DO and the set point of the hydraulic retention time (HRT) in the aerobic and anoxic zones can be defined.

Based on a comparison of two or more of the above measured values (e.g., by calculating a ratio of two measured values), one or more corrective actions can be taken that can reduce the potential for nitrous oxide formation. The corrective action can change a system parameter, such as changing the HRT of the aerobic zone, changing the HRT of the anoxic zone, changing the amount of COD added to the anoxic zone, changing the amount of DO in the aerobic zone, and changing the amount of ammonium in the influent. The HRT of each zone can be changed by varying the flow rate of the influent and/or effluent. For example, to increase the HRT of the anoxic zone, the effluent flow rate from that zone can be decreased. The amount of COD can be increased or decreased by adding more or less of easily consumable organics to an anoxic zone of the bioreactor, e.g., acetate, activated sludge, acetic acid, methanol, glycerin, etc. The DO levels can be changed by changing the output of the compressor or blower to aerobic zone. The DO levels in the aerobic zone may be initially set, for example, at a value of 2 mg $O_2$/L and, as a corrective action, can be varied within a range of from 0.5 mg $O_2$/L and 5 mg $O_2$/L, or from 1 mg $O_2$/L to 3 mg $O_2$/L, for example. The amount of ammonium in the influent can be changed by pretreating the influent to reduce ammonium or by changing upstream processes to reduce the production of ammonium.

High levels of ammonium in a WWTP is one of the primary reasons that can cause nitrous oxide formation. Accordingly, one aspect of controlling nitrous oxide production includes measuring the ammonium levels in an influent, and comparing the measured ammonium level to a predetermined threshold value. If the ammonium level in the influent is higher than the threshold value, then the potential for nitrous oxide formation in the WWTP exists, and one or more additional steps can be taken to confirm whether nitrous oxide is likely to be formed. In particular, the ammonium level and nitrite level in the aerobic zone can be measured and compared. However, this comparison can also be done independently of the ammonium levels in the influent. In either case, a ratio of the ammonium level and the nitrite level ($NH_4^+/NO_2^-$) in the aerobic zone can be determined, and compared to a threshold value. If this ratio is lower than the threshold value (e.g., lower than 6) or not "high" as shown in FIG. 4, then the potential for nitrous oxide formation is considered to be likely and one or more of the above-identified corrective measures can be taken such as increasing the HRT in the anoxic zone, e.g., by reducing the flow rate of the effluent from the anoxic zone. If the $NH_4^+/NO_2^-$ ratio is higher than a threshold value (e.g., higher than 6), then the potential for nitrous oxide formation is considered to be less likely.

In addition to, contingent upon, or alternatively to the above steps, an ammonium level and a nitrate level in the aerobic zone can be measured and compared. For example, a ratio of the ammonium level and the nitrate level ($NH_4^+/NO_3^-$) can be determined, and compared to a threshold value. If the $NH_4^+/NO_3^-$ ratio is lower than a threshold value (e.g., lower than 5) or not "high" as shown in FIG. 4, then the potential for nitrous oxide formation is considered to be likely and one or more of the above-identified corrective measures can be taken such as increasing the HRT in the anoxic zone. In some embodiments, the levels of nitrate in the aerobic zone may only be considered in this manner in the event that the $NH_4^+/NO_2^-$ ratio is high.

It may also be possible to compare the ammonium levels in the aerobic zone to a total amount of nitrite and nitrate in the aerobic zone, i.e., determining a ratio of $NH_4^+/(NO_2^+ + NO_3^-)$. If this ratio is lower than a threshold value (e.g., lower than 4), then the potential for nitrous oxide formation is considered to be likely and one or more of the above-identified corrective measures can be taken such as increasing the HRT in the anoxic zone.

In addition to the above, the hydroxylamine level and either or both of TOC and COD can be measured in the aerobic zone. COD is typically measured in a laboratory assay, whereas TOC can be measured online. TOC can be an acceptable substitute for COD if online or real-time measurements are desired. The values of the COD and/or TOC and hydroxylamine can be compared, e.g., by calculating a ratio of the (i) COD and/or TOC; to (ii) hydroxylamine level. The COD and/or TOC value can also be compared to the nitrite levels and/or nitrate levels in the aerobic zone, i.e., a ratio of (i) COD and/or TOC; to (ii) $NO_2^-$ level and/or $NO_3^-$ level. The COD and/or TOC value can also be compared to the total nitrogen in the aerobic zone, i.e., a ratio of (i) COD and/or TOC; to (ii) hydroxylamine level+$NO_2^-$ level+$NO_3^-$ level. If any of these ratios involving COD and/or TOC are lower than a threshold value (e.g., COD/$NH_4^+$<5; COD/$NO_2^-$<4; COD/$NO_3^-$<3; COD/$NH_2OH$<4), then one or more of the above-identified corrective actions can be taken such as adding COD to the system or decreasing the DO in the aerobic zone.

Additionally, if any of the ratios involving COD and/or TOC are higher than a threshold value, then the type of organic that is being added to the anoxic zone can be identified, and, if the type of organic is one that is difficult to biodegrade, then the levels of nitrous oxide can be measured, and if nitrous oxide is detected or is above a threshold value then one or more of the above-identified corrective actions can be taken to reduce nitrous oxide formation.

In addition to the above, the concentration of any of the nutrients can be measured in the anoxic zone of the biological reactor. The measured mounts of the nutrients in the anoxic zone can be used to validate the effectiveness of upstream corrective actions that have been taken as a feedback mechanism, and call also be used to optimize downstream processes, e.g., as a feedforward mechanism.

The concentrations of the ammonium, nitrite, nitrite, and hydroxylamine in the WWTP can be somewhat cyclical or varied over time. Accordingly, in calculating the above-identified ratios, the ammonium levels can be the highest determined value of the ammonium within a predetermined time period (e.g., over the cycle period). Similarly, in the above calculations involving COD and/or TOC, the highest determined value of those parameters within a predetermined time period can be used to calculate the ratios. Conversely, for the hydroxylamine, nitrite, and nitrate levels, the lowest determined value of those components within the predetermined time period can be used to calculate the ratios.

It will also be appreciated by those of skill in the art that other comparisons between the determined parameters could be used in place of the above described ratios. For example, an inverse of the above-described ratios can be used or a difference between measured values can be used.

In each of the above calculations, the threshold values that are used to trigger corrective actions can be tiered, e.g., so that a calculated ratio can be categorized at different levels or ranges (e.g., high, medium, low). Similarly, where corrective action needs to be taken, the amount of the change in the system parameter can be set based on which tier the ratio/comparison falls within. As a hypothetical example, if the $NH_4^+/NO_3^-$ ratio is below a first threshold value, but is not below a second threshold value, it could be considered to be in a medium tier, which triggers corrective action to increase the HRT in the anoxic zone by first amount. And if the $NH_4^+/NO_3^-$ ratio is below both threshold values, it could be considered to be in a low tier, which triggers corrective action to increase the HRT in the anoxic zone by a second amount which is greater than the first amount. The systems described herein can employ look up tables to associate each of the calculated ratios with the degree of corrective action that should be taken. Alternatively, the amount of corrective action can be directly proportional or inversely proportional to the calculated comparative value.

Each of the above ratios, or other comparisons, between two or more parameters of the wastewater treatment facility can be conducted independently of the other calculations. Alternatively, the calculation of each of the various values can proceed in series, as shown in FIG. 4, so that that the calculation of certain values, or at least the decision to take a corrective action based on those values, is contingent on whether another value is above or below a predetermined threshold. For example, as illustrated in FIG. 4, in one embodiment the ratio of $NH_4^+/NO_2^-$ is determined, and if that ratio is considered to be high, corrective action is only taken if the ratio of $NH_4^+/NO_3^-$ is considered to be low.

Aspects of this disclosure also include a control system, which can include computer hardware (e.g., processor, memory, display) and software that is programmed to provide notifications and/or send control signals to facilitate the reduction of nitrous oxide production in WWTPs. The variables used to calculate the ratios (e.g., two or more of $NH_4^+$, $NO_2^-$, $NO_3^-$, $NH_2OH$, $N_2O$, TOC) can be continuously, intermittently, or periodically measured with on-line sensors or lab measurements. As an alternative to lab and online sensor measurement of the system parameters, the control system can calculate the system parameters by using mathematical models that simulate the process. Data signals corresponding to the determined values can be sent to the control system, which can store the values in a memory and the controller/processor, such as a CPU, can calculate the ratios and compare the ratios to the various thresholds (including those in a LUT) that are stored in a memory. Based on this, the controller can send signals to automatically change the system parameters (e.g., HRT, DO, COD) in real time by using one or more feedback loop mechanisms (e.g., PID controller). As an alternative to feedback loops mechanisms, the control system has the ability to predict measured parameters using mathematical model simulation and or regression data models to automatically calculate and change the system parameters, and or provide notification to a system operator that the certain values are out of desired ranges and likely to produce nitrous oxide and/or recommend that the system operator take one or more corrective actions.

As an alternative to automatic control of the system parameters, the controller can calculate the ratios and compare the ratios to the various thresholds, and provide notifications (e.g., via a software dashboard that is displayed) to a system operator that the certain values are out of desired ranges and likely to produce nitrous oxide and/or recommend that the system operator take one or more corrective actions.

It will be appreciated that the above-disclosed features and functions, or alternatives thereof, may be desirably combined into different systems or methods. Also, various alternatives, modifications, variations or improvements may be subsequently made by those skilled in the art. As such, various changes may be made without departing from the spirit and scope of this disclosure.

What is claimed is:

1. A method for controlling nitrous oxide production in a wastewater treatment facility in which wastewater is treated with microbes in an anoxic zone and an aerobic zone, the method comprising:

determining an amount of ammonium in the aerobic zone;

determining an amount of at least two nitrogen compounds in the aerobic zone, the at least two nitrogen compounds including nitrite and hydroxylamine;

determining an amount of at least one of total organic carbon (TOC) and chemical oxygen demand (COD) in the aerobic zone;

calculating a first value that represents a comparison of the determined amount of ammonium and the determined amount of the nitrite such that the first value is indicative of relative amounts of the ammonium and the nitrite in the aerobic zone;

comparing the calculated first value to a first threshold value;

calculating a second value that is indicative of relative amounts of (a) the at least one of TOC and COD and (b) the hydroxylamine in the aerobic zone;

comparing the calculated second value to a second threshold value;

based on both the comparing steps, performing at least one of (a) displaying a notification on a display; and (b) taking one or more corrective actions to change a system parameter of the wastewater treatment facility.

2. The method according to claim 1, wherein the calculated first value is a ratio of the determined amount of ammonium and the determined amount of nitrite.

3. The method according to claim 1, wherein the one or more corrective actions are performed, and wherein the one or more corrective actions are effective to reduce an amount of nitrous oxide that is produced in the wastewater treatment facility.

4. The method according to claim 1, wherein the one or more corrective actions are performed, and wherein the one or more corrective actions are selected from the group consisting of (i) changing an amount of chemical oxygen demanded added to the anoxic zone; (ii) changing an amount of dissolved oxygen in the aerobic zone; and (iii) changing an amount of ammonium in the wastewater in an influent to either the anoxic zone or the aerobic zone.

5. The method according to claim 1, wherein the one or more corrective actions are performed and wherein the one or more corrective actions includes increasing a hydraulic retention time of the anoxic zone.

6. The method according to claim 1, wherein the step of determining the amount of the at least two nitrogen compounds in the aerobic zone includes determining an amount of nitrate in the aerobic zone, and further comprising calculating a ratio of the determined amount of ammonium and the determined amount of nitrate.

7. The method according to claim 1, wherein the one or more corrective actions includes at least one of adding COD to the anoxic zone and decreasing an amount of dissolved oxygen in the aerobic zone.

8. The method according to claim 1, further comprising determining an amount of ammonium in an influent to either the anoxic zone or the aerobic zone, and comparing the measured amount of ammonium in the influent to a third threshold value.

9. The method according to claim 1, wherein the one or more corrective actions are performed and include changing a hydraulic retention time of the aerobic zone.

10. The method according to claim 1, wherein the one or more corrective actions are performed and include changing a hydraulic retention time of the anoxic zone.

11. The method according to claim 1, wherein (i) the at least two nitrogen compounds includes nitrate, (ii) the method further includes calculating a ratio that is indicative of relative amounts of the ammonium and the nitrate in the aerobic zone, and (iii) based on the comparison of the ratio to the threshold value, the one or more corrective actions are performed to increase a hydraulic retention time of the anoxic zone.

* * * * *